United States Patent [19]

Wang

[11] 4,110,111
[45] Aug. 29, 1978

[54] METAL ALLOY AND METHOD OF PREPARATION THEREOF

[75] Inventor: Frederick E. Wang, Silver Spring, Md.

[73] Assignee: The United States of America as represented by the Secretary of the Navy, Washington, D.C.

[21] Appl. No.: 710,055

[22] Filed: Jul. 28, 1976

Related U.S. Application Data

[63] Continuation-in-part of Ser. No. 377,671, Jul. 5, 1973, abandoned.

[51] Int. Cl.² .................................................. C22C 24/00
[52] U.S. Cl. .................................... 75/134 A; 75/134 P
[58] Field of Search ......................... 75/134 A, 134 P; 423/289

[56] References Cited

PUBLICATIONS

Mestwerd et al., AIAA Journal, 1976, vol. 14, #1, paper presented Jan. 22, 1975, pp. 100–102.

*Primary Examiner*—Brooks H. Hunt
*Attorney, Agent, or Firm*—R. S. Sciascia; A. L. Branning; R. D. Johnson

[57] ABSTRACT

Metallic alloys of the formula $Li_xB_{1-x}$ wherein $0<x<1$ are obtained by a four step heating and mixing process. These alloys find use in many areas where light weight, strong materials are required.

2 Claims, 1 Drawing Figure

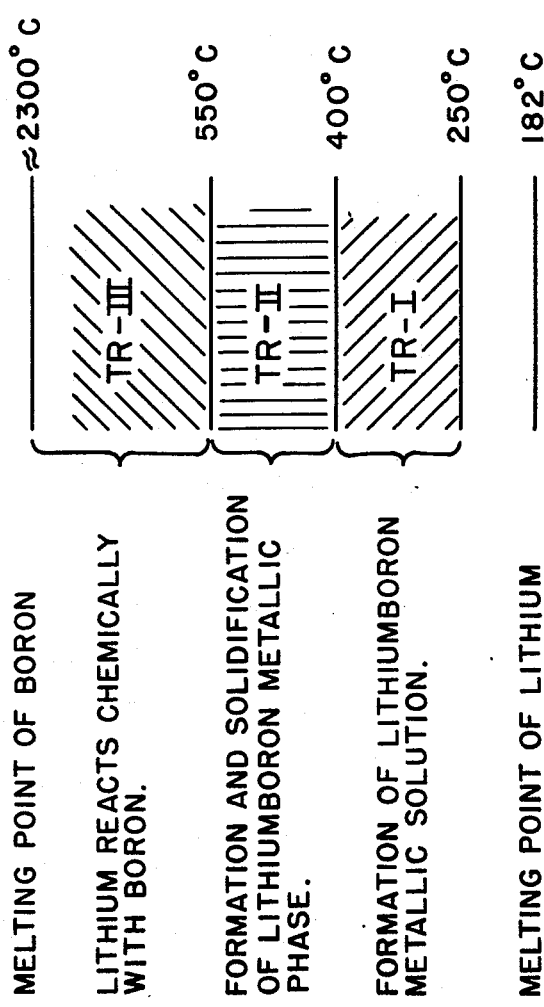

METAL ALLOY AND METHOD OF PREPARATION THEREOF

CROSS REFERENCE TO RELATED APPLICATIONS

This is a continuation-in-part of copending application Ser. No. 377,671, filed on July 5, 1973 now abandoned.

BACKGROUND OF THE INVENTION

This invention generally relates to light weight metal alloys and more particularly to an alloy of the formula $Li_xB_{1-x}$ wherein $0 < x < 1$ and $x$ is the atomic fraction of lithium.

For many uses it is desirable to have intermetallic alloys which are extremely light in weight, low in atomic number, have high melting points, are ductile, malleable, machineable and structurally strong. Beryllium has been used because it meets many of these requirements. However, beryllium metal, by nature, is too brittle and toxic and is therefore difficult to handle. Thus, a search has gone on for other materials which can take the place of beryllium and which do not have the same disadvantages as beryllium.

In this regard attempts have been made to prepare metallic lithium-boron alloys. Thus, Markowskii and Kondraskev at Zh. Neorgen Khim., Volume 2, pages 34–41 (1957), Secrist et al, U.S. Atomic Energy Comm. and French Pat. No. 1,461,878, have all attempted to prepare metallic lithium-boron alloys. In all of these cases, however, dark powders of undetermined composition were obtained. These powders were inorganic compounds which could not be utilized as structural material because of the lack of the characteristics of metals. It is believed that all of these previous attempts to prepare metallic Li—B alloys results in the borides rather than true metal alloys. The reasons for this will hereinafter be discussed. Thus, research has been conducted in an attempt to find a method of preparing metallic Li—B alloys.

SUMMARY OF THE INVENTION

Accordingly, one object of this invention is to provide metallic lithium-boron alloys.

Another object of this invention is to provide a method for preparing metallic lithium-boron alloys.

Yet another object of this invention is to provide a light weight metallic alloy.

A still further object of this invention is to provide a metal alloy which has a low atomic number.

Yet a still further object of this invention is to provide a metallic alloy which has a relatively high melting point.

Another object of this invention is to provide a metallic alloy which is ductile, malleable, machineable and structurally strong.

These and other objects of this invention are accomplished by providing a metallic alloy of the formula $Li_xB_{1-x}$ wherein $0 < x < 1$ and $x$ is the atomic fraction of lithium. These alloys are prepared by an unconventional four step process.

BRIEF DESCRIPTION OF THE DRAWING

Still other objects and many of the attendant advantages of the present invention will be readily appreciated as the same becomes better understood by reference to the following detailed description when considered in connection with the accompanying drawing wherein the solitary FIGURE is a graphical representation of stages that the initial reactants must go through in order to prepare the metallic alloys of this invention.

DESCRIPTION OF THE PREFERRED EMBODIMENT

The metallic alloys produced by the process of this invention are metallic alloys of the formula $Li_xB_{1-x}$ wherein $0 < x < 1$ and $x$ is the atomic fraction of lithium. This metallic alloy, however, cannot be prepared merely by melting a mixture of the elemental materials but rather must be prepared by an unconventional four step process.

The appropriate quantity of elemental lithium and boron for any desired predetermined composition is placed in a crucible and the physical mixture is heated to a temperature in the range of 250°–400° C. It should be noted that this is a temperature above the melting point of lithium (which is 182° C.) and is within the the range denoted TR-I in the drawing. While the mixture is held within this temperature range, it is mechanically stirred until the boron dissolves completely into the liquid lithium to form a liquid solution. Crystalline boron (which melts at about 2300° C.) is preferred over amorphous boron because invariably amorphous boron has an oxide coating which prevents or at least retards the reaction between lithium and boron. As a result, the amorphous boron either fails to dissolve in the liquid lithium or only dissolves with great difficulty. However, amorphous boron may be used in this invention if the boron oxide content in the amorphous boron is kept at less than 0.2 weight percent. This step may take as little as 10 minutes or may take as long as 1 hour or more, depending of the size of boron crystals as well as the relative amounts of lithium and boron. Great care must be taken during this step to keep the temperature within the TR-I range so that it does not exceed about 400° C. The reason for this restriction will be more fully discussed hereinafter.

The lithium-boron liquid metallic solution thus formed in the above step is then heated slowly into temperature range TR-II (about 400° C. to about 550° C.). Within this range the viscosity of the liquid metallic solution increases as the temperature is increased and eventually solidifies (somewhat exothermically) into a metallic phase which is stable thereafter and up to about 1400° C. depending on the composition. It should be emphasized that the solidification of the liquid alloy within the temperature range of from about 530° C. to 550° C. is an essential step in producing an alloy which is stable at temperatures above 550° C. Within this temperature range a exotherm will be observed and this exotherm marks the completion of the alloying and solidification process. Without this exotherm the alloy will not be stable. By way of observation it should be noted that this exotherm occurs momentarily after the appearance of the top layer of material in the crucible changes from having a metallic luster to a whitish non-metallic appearance.

Again in step 2 care must be taken not to overheat the solution by by-passing the TR-II and getting into TR-III for if the solution is overheated, i.e., brought directly from TR-I to TR-III before complete solidification, boron and lithium will react violently with the release of a considerable amount of heat and will result in the blackish or brownish powders such as obtained by Markovskii et al, Secrist et al and the French patent. Thus, these prior art procedures went above 550° C. temperature before solidification was complete and they did not obtain metallic alloys but rather obtained powders which could not be formed into solid objects, which were not machineable, were not ductile, malleable or structurally strong. These references most probably obtained borides and not a metallic phase which is formed within the TR-II range. Note that once the metallic phase is formed, further heating, even into TR-III, will not bring about the violent chemical reaction which forms the borides.

Because of the high reactivity of molten lithium with oxygen and with water all of the steps of this process must be carried out in an inert atmosphere (e.g., dry neon, argon, or helium).

Although the hereinbefore described method can be used to prepare alloys of the formula $Li_xB_{1-x}$ wherein $0<x<1$ and $x$ is the atomic fraction of lithium metal, metal alloys wherein $0.10<x<0.95$ are preferred and metal alloys wherein $0.30<x<0.90$ are more preferred.

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE I

In an inert atmosphere (helium) glove box 4.683 grams of lithium and 4.596 grams of crystalline boron were placed in a crucible and slowly heated in a furnace to 400° C. During the process, the elemental materials were mechanically stirred. Between 250° C. and 400° C., the crystalline boron dissolved into the lithium forming a lithium-boron metallic solution. After the boron has dissolved, the temperature was slowly increased from 400° C. to 550° C. Within this temperature range the viscosity of the molten metallic lithium boron solution increased so that the mechanical stirring became difficult. Between 550° C. and 650° C. the sample became solid, and the surface of the sample changed from metallic to an off white color. After the surface change, the sample underwent a transition with a release of heat. The sample (61.4 atomic percent Lithium and 38.6 atomic percent Boron) was metallic in nature and not a black powder.

EXAMPLE II

In an inert atmosphere (helium) glove box 6.000 grams of lithium and 9.000 grams of crystalline boron (−80 + 120 mesh) were placed in a crucible and slowly heated in a furnace to 500° C. During the process, the elemental materials were mechanically stirred. As the temperature of the furnace was slowly increased to 500° C., the crystalline boron completely dissolved into the lithium, and the viscosity of the molten metallic lithium boron solution increased so that mechanical stirring become difficult. Between 500° C. and 600° C. the sample became solid and the surface of the sample changed from metallic to an off white color. After the surface changed, the sample underwent a transition with a release of heat. The sample (51.0 atomic percent Lithium and 49.0 atomic percent Boron) was metallic in nature.

EXAMPLE III

In an inert atmosphere (helium) glove box 4.859 grams of lithium and 15.141 grams of crystalline boron (−30 to 60 mesh) were placed in a crucible and processed according to example II. The material (33.3 atomic percent Lithium and 66.7 atomic percent boron) formed was metallic nature.

The following table lists some of the lithium-boron metal alloys which have been prepared.

TABLE I

| Atomic Percentages | | Weight Percentages | | Heat Evolved During Transition, |
|---|---|---|---|---|
| Li | B | Li | B | cal/gm. |
| 90.3 | 9.7 | 85.7 | 14.3 | 1.56 |
| 82.4 | 17.6 | 75.0 | 25.0 | 2.46 |
| 75.7 | 24.3 | 66.7 | 33.3 | 4.70 |
| 67.5 | 32.5 | 57.1 | 42.9 | 8.37 |
| 66.3 | 33.7 | 55.8 | 44.2 | 7.47 |
| 61.4 | 38.6 | 50.5 | 49.5 | — |
| 60.9 | 39.1 | 50.0 | 50.0 | 11.4 |
| 57.7 | 42.3 | 46.7 | 53.3 | 14.3 |
| 57.2 | 42.8 | 46.2 | 53.8 | 13.2 |
| 54.8 | 45.2 | 43.8 | 56.2 | 15.9 |
| 53.9 | 46.1 | 42.9 | 57.1 | 15.4 |
| 51.0 | 49.0 | 40.0 | 60.0 | 16.0 |
| 48.3 | 51.7 | 37.5 | 62.5 | 15.2 |
| 44.8 | 55.2 | 34.3 | 65.7 | 14.3 |
| 41.8 | 58.2 | 31.6 | 68.4 | 14.9 |
| 33.3 | 66.7 | 24.3 | 75.7 | — |

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A metallic alloy of the formula $Li_xB_{1-x}$ where $0.30<x<0.90$ and $x$ is the atomic fraction of lithium.

2. A method of preparing the alloy of claim 1 comprising:
   (a) heating a mixture of elemental lithium and some crystalline boron to a temperature between about 250° C. and about 400° C.;
   (b) maintaining said temperature for a time sufficient to effect complete dissolution of boron in the liquid lithium;
   (c) raising the temperature of said solution to about 400° C. to about 550° C. to effect total solidification of the liquid solution; and
   (d) keeping the temperature between about 530° C. and about 550° C. until an exotherm is observed; provided that all of the steps are carried out in an inert atmosphere.

* * * * *